United States Patent
Guedes-Pinto et al.

(10) Patent No.: US 11,482,908 B1
(45) Date of Patent: Oct. 25, 2022

(54) SYSTEM, METHOD AND APPARATUS FOR DIRECT LIQUID-COOLED AXIAL FLUX ELECTRIC MACHINE WITH PCB STATOR

(71) Applicant: Infinitum Electric, Inc., Austin, TX (US)

(72) Inventors: Paulo Guedes-Pinto, Round Rock, TX (US); Randal A. Lee, Austin, TX (US)

(73) Assignee: INFINITUM ELECTRIC, INC., Round Rock, TX (US)

( * ) Notice: Subject to any disclaimer, the term of this patent is extended or adjusted under 35 U.S.C. 154(b) by 0 days.

(21) Appl. No.: 17/227,888

(22) Filed: Apr. 12, 2021

(51) Int. Cl.
| | |
|---|---|
| *H02K 9/19* | (2006.01) |
| *H02K 9/193* | (2006.01) |
| *H02K 5/20* | (2006.01) |
| *H02K 7/00* | (2006.01) |
| *H02K 3/26* | (2006.01) |
| *H02K 21/24* | (2006.01) |

(52) U.S. Cl.
CPC ............. *H02K 9/193* (2013.01); *H02K 3/26* (2013.01); *H02K 5/203* (2021.01); *H02K 7/003* (2013.01); *H02K 21/24* (2013.01); *H02K 2203/03* (2013.01)

(58) Field of Classification Search
CPC .......... H02K 1/20; H02K 3/26; H02K 1/2793; H02K 21/24; H02K 3/24; H02K 16/02; H02K 9/00; H02K 9/19; H02K 9/193; H02K 9/22; H02K 9/227; H02K 5/00; H02K 5/17; H02K 5/20; H02K 5/203
USPC ................... 310/52, 54, 57, 58, 59, 60 A, 61
See application file for complete search history.

(56) References Cited

U.S. PATENT DOCUMENTS

| | | | |
|---|---|---|---|
| 2,248,285 A | * | 7/1941 | Reinhardt .............. H02K 19/08 310/164 |
| 2,411,781 A | * | 11/1946 | Fell .......................... H02K 9/06 310/61 |
| 3,230,406 A | | 1/1966 | Henry-Baudot |
| 3,944,857 A | | 3/1976 | Faulhaber |
| 4,578,608 A | | 3/1986 | Mech et al. |
| 4,707,645 A | | 11/1987 | Miyao et al. |
| 4,760,294 A | | 7/1988 | Hansen |
| 4,982,130 A | | 1/1991 | Cap et al. |
| 5,021,698 A | | 6/1991 | Pullen et al. |

(Continued)

FOREIGN PATENT DOCUMENTS

| | | |
|---|---|---|
| AU | 2016329080 B2 | 9/2016 |
| CN | 1675815 | 9/2005 |

(Continued)

OTHER PUBLICATIONS

DE-102010009486-A1 (English Translation) (Year: 2011).*

(Continued)

*Primary Examiner* — Tran N Nguyen
(74) *Attorney, Agent, or Firm* — Dickinson Wright PLLC; Michael E. Noe, Jr.

(57) ABSTRACT

An axial field rotary energy system has a housing and rotors with an axis of rotation that are rotatably coupled to the housing. Each rotor includes a magnet. A stator assembly is located axially between the rotors and coupled to the housing. The stator assembly has a printed circuit board (PCB). The PCB includes a plurality of layers, and each layer has coils. A shaft is coupled to the rotors and the housing. The shaft can dispense a liquid coolant between the rotors and stator assembly. The housing can include a sump to collect the liquid coolant.

12 Claims, 6 Drawing Sheets

(56) References Cited

U.S. PATENT DOCUMENTS

| | | |
|---|---|---|
| 5,099,162 A | 3/1992 | Sawada |
| 5,176,509 A | 1/1993 | Schmider et al. |
| 5,334,899 A | 8/1994 | Skybyk |
| 5,349,276 A | 9/1994 | Mezzatesta et al. |
| 5,392,176 A | 2/1995 | Anderson |
| 5,644,183 A | 1/1997 | Van Loenen et al. |
| 5,666,011 A | 9/1997 | Hong |
| 5,789,841 A | 8/1998 | Wang |
| 5,887,145 A | 3/1999 | Harari et al. |
| 5,969,909 A | 10/1999 | Cheong |
| 5,982,074 A | 11/1999 | Smith et al. |
| 6,005,324 A | 12/1999 | Kim |
| 6,031,738 A | 2/2000 | Lipo et al. |
| 6,304,011 B1 | 10/2001 | Pullen et al. |
| 6,348,751 B1 | 2/2002 | Jermakian et al. |
| 6,369,470 B1 | 4/2002 | Kylander et al. |
| 6,411,002 B1 | 6/2002 | Smith et al. |
| 6,488,486 B1 | 12/2002 | Deblerser |
| 6,664,673 B2 | 12/2003 | Lopatinsky et al. |
| 6,700,252 B2 | 3/2004 | Fleshman et al. |
| 6,707,221 B2 | 3/2004 | Carl |
| 6,713,911 B2 | 3/2004 | Yamaguchi |
| 6,787,965 B1 | 9/2004 | Horng et al. |
| 6,836,039 B2 | 12/2004 | Choi et al. |
| 6,909,215 B2 | 6/2005 | Bryant |
| 6,923,619 B2 | 8/2005 | Fedoseyev et al. |
| 6,998,751 B2 | 2/2006 | Lopatinsky et al. |
| 7,036,205 B2 | 5/2006 | Fukushima et al. |
| 7,081,698 B1 | 7/2006 | Burkholder et al. |
| 7,109,625 B1 | 9/2006 | Jore et al. |
| 7,112,910 B2 | 9/2006 | Lopatinsky et al. |
| 7,165,413 B2 | 1/2007 | Symons |
| 7,282,828 B2 | 10/2007 | Takeuchi |
| 7,291,956 B2 | 11/2007 | Itoh et al. |
| 7,375,449 B2 | 5/2008 | Butterfield |
| 7,402,934 B1 | 7/2008 | Gabrys |
| 7,456,536 B2 * | 11/2008 | Tanaka .............. H02K 9/227 310/90 |
| 7,573,173 B1 | 8/2009 | Frownfelter |
| 7,608,964 B2 | 10/2009 | Yamagiwa |
| 7,663,269 B2 | 2/2010 | Laughlin |
| 7,663,279 B2 | 2/2010 | Tsai et al. |
| 7,741,804 B2 | 6/2010 | Fridhendler et al. |
| 7,800,274 B2 | 9/2010 | Yamaguchi et al. |
| 7,888,834 B2 | 2/2011 | Tsai et al. |
| 8,026,626 B1 * | 9/2011 | Meller ................ F03D 9/25 290/55 |
| 8,035,267 B2 | 10/2011 | Suzuki et al. |
| 8,115,361 B2 | 2/2012 | Iki et al. |
| 8,148,870 B2 | 4/2012 | Iki et al. |
| 8,193,678 B2 | 6/2012 | Horng et al. |
| 8,193,781 B2 | 6/2012 | Lin et al. |
| 8,362,751 B2 | 1/2013 | Lin et al. |
| 8,382,450 B2 | 2/2013 | Ida et al. |
| 8,384,261 B2 | 2/2013 | Kinpara et al. |
| 8,536,747 B1 | 9/2013 | Baggett |
| 8,558,425 B2 | 10/2013 | Stahlhut et al. |
| 8,624,463 B2 | 1/2014 | Schmidt |
| 8,736,133 B1 | 5/2014 | Smith et al. |
| 8,785,784 B1 * | 7/2014 | Duford ............... H05K 1/165 174/255 |
| 8,823,241 B2 | 9/2014 | Jore et al. |
| 9,154,024 B2 | 10/2015 | Jore et al. |
| 9,240,733 B2 | 1/2016 | Royak et al. |
| 9,287,739 B2 | 3/2016 | Ashe et al. |
| 9,407,117 B2 | 8/2016 | Rimai et al. |
| 9,431,875 B2 | 8/2016 | Keogh et al. |
| 9,509,198 B2 | 11/2016 | Jahshan |
| 9,570,945 B2 | 2/2017 | Fischer |
| 9,583,982 B2 | 2/2017 | Ashe et al. |
| 9,595,857 B2 | 3/2017 | Cawthorne et al. |
| 9,673,684 B2 | 6/2017 | Shaw |
| 9,673,688 B2 | 6/2017 | Shaw |
| 9,762,099 B2 | 9/2017 | Jore et al. |
| 9,800,109 B2 | 10/2017 | Shaw |
| 9,859,763 B2 | 1/2018 | Shaw |
| 10,135,310 B2 | 11/2018 | Schuler et al. |
| 10,141,803 B2 | 11/2018 | Schuler et al. |
| 10,141,804 B2 | 11/2018 | Schuler et al. |
| 10,170,953 B2 | 1/2019 | Shaw |
| 10,186,922 B2 | 1/2019 | Schuler et al. |
| 10,211,694 B1 | 2/2019 | Shaw |
| 10,256,690 B2 | 4/2019 | Shaw |
| 10,263,485 B2 | 4/2019 | Koenen et al. |
| 10,340,760 B2 | 7/2019 | Schuler et al. |
| 10,393,840 B2 | 8/2019 | Feiweier |
| 10,461,612 B2 | 10/2019 | Gloss |
| 10,511,201 B2 | 12/2019 | Kim et al. |
| 10,718,339 B2 | 7/2020 | Patton et al. |
| 10,727,712 B2 | 7/2020 | Schuler et al. |
| 10,748,689 B2 | 8/2020 | Kim et al. |
| 10,778,071 B2 | 9/2020 | Kim et al. |
| 10,804,789 B2 | 10/2020 | Hsu et al. |
| 10,826,418 B2 | 11/2020 | Frampton et al. |
| 10,837,494 B2 | 11/2020 | Den Haak et al. |
| 10,855,129 B1 | 12/2020 | Lenius et al. |
| 10,896,271 B1 | 1/2021 | Baudart et al. |
| 10,910,903 B2 | 2/2021 | Witczak et al. |
| 10,931,175 B2 | 2/2021 | Gassend et al. |
| 2003/0020353 A1 | 1/2003 | Lopatinsky et al. |
| 2003/0042570 A1 | 3/2003 | Hanks |
| 2003/0067234 A1 | 4/2003 | White et al. |
| 2004/0108789 A1 | 6/2004 | Marshall |
| 2004/0245878 A1 | 12/2004 | Kim et al. |
| 2005/0166570 A1 * | 8/2005 | Granitz ............... F01D 25/18 60/39.08 |
| 2005/0218746 A1 | 10/2005 | Fukasaku et al. |
| 2006/0022543 A1 | 2/2006 | Takeuchi |
| 2006/0055265 A1 | 3/2006 | Zalusky |
| 2006/0202584 A1 | 9/2006 | Jore et al. |
| 2007/0048158 A1 | 3/2007 | Kochan |
| 2007/0296369 A1 | 12/2007 | Veh |
| 2008/0017402 A1 | 1/2008 | Huang et al. |
| 2008/0018187 A1 | 1/2008 | Yamaguchi et al. |
| 2008/0042515 A1 | 2/2008 | Butterfield |
| 2008/0100166 A1 | 5/2008 | Stahlhut et al. |
| 2008/0100174 A1 | 5/2008 | Stahlhut et al. |
| 2008/0101966 A1 | 5/2008 | Lopatinsky et al. |
| 2008/0272666 A1 | 11/2008 | Halstead |
| 2008/0278010 A1 | 11/2008 | Ishikawa et al. |
| 2009/0051317 A1 | 2/2009 | Fridhendler et al. |
| 2009/0109624 A1 | 4/2009 | Chan et al. |
| 2009/0140600 A1 | 6/2009 | Tsai et al. |
| 2009/0200890 A1 | 8/2009 | Halstead |
| 2009/0230788 A1 | 9/2009 | Kurokawa |
| 2010/0090553 A1 | 4/2010 | Ritchey |
| 2010/0119385 A1 | 5/2010 | Hanaoka et al. |
| 2010/0145401 A1 | 6/2010 | Nishiguchi et al. |
| 2010/0156401 A1 | 6/2010 | Nishiguchi et al. |
| 2010/0219702 A1 * | 9/2010 | Jajtic ................. H02K 41/02 310/12.29 |
| 2010/0253170 A1 | 10/2010 | Bi et al. |
| 2010/0277025 A1 | 11/2010 | Doi et al. |
| 2010/0283252 A1 | 11/2010 | Fradella |
| 2010/0314974 A1 | 12/2010 | Horng et al. |
| 2011/0057536 A1 | 3/2011 | Horng et al. |
| 2011/0140558 A1 | 6/2011 | Kinpara et al. |
| 2011/0253310 A1 | 10/2011 | Benjamin |
| 2011/0273048 A1 | 11/2011 | Jore et al. |
| 2011/0291511 A1 | 12/2011 | Crocker |
| 2012/0001523 A1 | 1/2012 | Lordo |
| 2012/0169154 A1 | 7/2012 | Curodeau |
| 2012/0228972 A1 | 9/2012 | Moya et al. |
| 2012/0235523 A1 | 9/2012 | Moya et al. |
| 2012/0235530 A1 | 9/2012 | Moya et al. |
| 2012/0256422 A1 | 10/2012 | Fradella |
| 2012/0256585 A1 | 10/2012 | Partovi et al. |
| 2013/0049500 A1 | 2/2013 | Shan et al. |
| 2013/0076192 A1 | 2/2013 | Tanimoto |
| 2013/0066194 A1 | 3/2013 | Seter et al. |
| 2013/0069473 A1 | 3/2013 | Miyata et al. |
| 2013/0307356 A1 | 11/2013 | Tanimoto |
| 2013/0307366 A1 | 11/2013 | Naginsky et al. |
| 2014/0042842 A1 | 2/2014 | Tokoi et al. |

(56) References Cited

U.S. PATENT DOCUMENTS

| | | | |
|---|---|---|---|
| 2014/0175922 A1 | 6/2014 | Jore et al. | |
| 2014/0210285 A1 | 7/2014 | Fahimi | |
| 2014/0265748 A1 | 9/2014 | Clendenen et al. | |
| 2014/0306565 A1 | 10/2014 | James | |
| 2014/0319949 A1 | 10/2014 | Langreck | |
| 2015/0015102 A1 | 1/2015 | Wong et al. | |
| 2015/0048713 A1 | 2/2015 | Caamano et al. | |
| 2015/0076929 A1 | 3/2015 | Elenga et al. | |
| 2015/0084446 A1 | 3/2015 | Atar | |
| 2015/0111752 A1 | 4/2015 | Guina et al. | |
| 2015/0214801 A1 | 7/2015 | Libault | |
| 2015/0244213 A1 | 8/2015 | Tsai et al. | |
| 2015/0262610 A1 | 9/2015 | Lin et al. | |
| 2015/0318751 A1 | 11/2015 | Smith et al. | |
| 2015/0318772 A1 | 11/2015 | Jahshan | |
| 2015/0349609 A1 | 12/2015 | Tremelling et al. | |
| 2015/0369216 A1 | 12/2015 | Kisovec | |
| 2016/0036308 A1 | 2/2016 | Bailey et al. | |
| 2016/0069352 A1 | 3/2016 | Kreidler et al. | |
| 2016/0072359 A1 | 3/2016 | Kreidler et al. | |
| 2016/0105065 A1 | 4/2016 | Takahashi | |
| 2016/0126794 A1 | 5/2016 | Gery et al. | |
| 2016/0163445 A1 | 6/2016 | Bertels | |
| 2016/0197569 A1 | 7/2016 | Lamprecht | |
| 2016/0218577 A1 | 7/2016 | Chen et al. | |
| 2016/0233751 A1 | 8/2016 | Theuret | |
| 2016/0285323 A1 | 9/2016 | Lin et al. | |
| 2016/0301275 A1 | 10/2016 | Head et al. | |
| 2016/0315510 A1 | 10/2016 | Kawamata et al. | |
| 2016/0322884 A1 | 11/2016 | Perriere | |
| 2016/0329796 A1 | 11/2016 | Hano et al. | |
| 2016/0336824 A1 | 11/2016 | Duan et al. | |
| 2016/0336835 A1 | 11/2016 | Bickers et al. | |
| 2016/0336836 A1 | 11/2016 | Bickers et al. | |
| 2016/0341202 A1 | 11/2016 | Chai et al. | |
| 2017/0027081 A1* | 1/2017 | Yin | H05K 7/20254 |
| 2017/0047792 A1 | 2/2017 | Klassen et al. | |
| 2017/0047793 A1 | 2/2017 | Klassen et al. | |
| 2017/0067470 A1 | 3/2017 | Patton | |
| 2017/0098973 A1 | 4/2017 | Shaw | |
| 2017/0098982 A1 | 4/2017 | Shaw | |
| 2017/0155291 A1 | 6/2017 | Deak et al. | |
| 2017/0155347 A1 | 6/2017 | Park et al. | |
| 2017/0194823 A1 | 7/2017 | Tokoi et al. | |
| 2017/0229949 A1 | 8/2017 | Na et al. | |
| 2017/0317558 A1 | 11/2017 | Steg et al. | |
| 2017/0338760 A1 | 11/2017 | Gibbs et al. | |
| 2018/0019646 A1 | 1/2018 | Quick et al. | |
| 2018/0080573 A1 | 3/2018 | Bourqui | |
| 2018/0175691 A1 | 6/2018 | Koenen et al. | |
| 2018/0219445 A1 | 8/2018 | Jore et al. | |
| 2018/0331632 A1 | 11/2018 | Wang et al. | |
| 2018/0351441 A1 | 12/2018 | Milheim | |
| 2019/0074746 A1 | 3/2019 | Schuler et al. | |
| 2019/0109504 A1 | 4/2019 | Schuler | |
| 2019/0393749 A1 | 12/2019 | Park et al. | |
| 2020/0052534 A1* | 2/2020 | Nakane | H02K 9/19 |
| 2020/0067361 A1 | 2/2020 | Shaw et al. | |
| 2020/0128671 A1 | 4/2020 | Xiang et al. | |
| 2020/0146174 A1 | 5/2020 | Song et al. | |
| 2020/0173339 A1* | 6/2020 | Russalian | H02K 1/14 |
| 2020/0177034 A1 | 6/2020 | Beyerl et al. | |
| 2020/0204025 A9 | 6/2020 | Schuler et al. | |
| 2020/0220406 A1 | 7/2020 | Schuler et al. | |
| 2020/0256452 A1* | 8/2020 | Fukasawa | F16H 57/043 |
| 2020/0280233 A1 | 9/2020 | Dehez et al. | |
| 2020/0303982 A1 | 9/2020 | Richardson | |
| 2020/0313520 A1 | 10/2020 | Quick et al. | |
| 2020/0381970 A1 | 12/2020 | Dehez et al. | |
| 2020/0389080 A1 | 12/2020 | Haase et al. | |
| 2021/0050767 A1 | 2/2021 | Yen et al. | |
| 2021/0119522 A1* | 4/2021 | Holland | H02K 1/182 |

FOREIGN PATENT DOCUMENTS

| | | | | |
|---|---|---|---|---|
| CN | 101861693 | | 10/2010 | |
| CN | 203086307 | * | 7/2013 | H02K 9/00 |
| CN | 203377758 | | 1/2014 | |
| CN | 103930024 | | 7/2014 | |
| CN | 105490476 | | 4/2016 | |
| CN | 105720717 | | 6/2016 | |
| CN | 105896760 | | 8/2016 | |
| CN | 106374643 | | 2/2017 | |
| CN | 107534381 | A | 1/2018 | |
| CN | 108119539 | A | 6/2018 | |
| CN | 109072929 | A | 12/2018 | |
| CN | 110100372 | A | 8/2019 | |
| CN | 111010008 | | 4/2020 | |
| CN | 111342597 | A * | 6/2020 | H02K 21/24 |
| CN | 111835153 | A | 10/2020 | |
| CN | 112003405 | A | 11/2020 | |
| CN | 112292800 | A | 1/2021 | |
| CN | 109995153 | B | 2/2021 | |
| CN | 112368913 | A | 2/2021 | |
| CN | 109219916 | B | 3/2021 | |
| DE | 102010009486 | A1 * | 9/2011 | H02K 9/06 |
| EP | 2863524 | | 4/2015 | |
| EP | 3034763 | | 6/2016 | |
| EP | 3104504 | | 12/2016 | |
| EP | 3785356 | A1 | 3/2020 | |
| EP | 2878064 | | 11/2020 | |
| EP | 3243258 | | 11/2020 | |
| EP | 3754813 | A1 | 12/2020 | |
| EP | 3446396 | B1 | 2/2021 | |
| GB | 1317092 | | 5/1973 | |
| GB | 2338117 | | 12/1999 | |
| GB | 2485185 | | 5/2012 | |
| JP | 59127556 | A * | 7/1984 | H02K 9/19 |
| JP | S6253146 | | 3/1987 | |
| JP | H06311682 | | 11/1994 | |
| JP | H0865935 | | 3/1996 | |
| JP | H10248224 | | 9/1998 | |
| JP | 2004088969 | | 3/2004 | |
| JP | 2004088997 | | 3/2004 | |
| JP | 2004096872 | | 3/2004 | |
| JP | 2005502291 | | 1/2005 | |
| JP | 2005521378 | | 7/2005 | |
| JP | 2006066527 | | 3/2006 | |
| JP | 2009001917 | | 12/2008 | |
| JP | 2010130818 | | 6/2010 | |
| JP | 2010172094 | | 8/2010 | |
| JP | 2010528581 | | 8/2010 | |
| JP | 4996712 | | 8/2012 | |
| JP | 2012161135 | | 8/2012 | |
| JP | 2013051880 | | 3/2013 | |
| JP | 2015136201 | | 7/2015 | |
| JP | 2021507664 | A | 2/2021 | |
| WO | 2007114079 | | 11/2007 | |
| WO | 2014164334 | | 10/2014 | |
| WO | 2016021852 | | 2/2016 | |
| WO | 2016034570 | | 3/2016 | |
| WO | 2016127207 | | 8/2016 | |
| WO | 2016169332 | | 10/2016 | |
| WO | 2016185216 | | 11/2016 | |
| WO | 2016185218 | | 11/2016 | |
| WO | 2017032501 | | 3/2017 | |
| WO | 2017088082 | | 6/2017 | |
| WO | 2018132469 | | 7/2018 | |
| WO | 2019121037 | | 6/2019 | |
| WO | 2020092470 | A1 | 5/2020 | |

OTHER PUBLICATIONS

CN-111342597-A (English Translation) (Year: 2020).*
JP-59127556-A (English Translation) (Year: 1984).*
International Search Report and Written Opinion of the International Searching Authority for PCT Patent Application No. PCT/US18/13145 dated Mar. 15, 2018; 8 pages.
International Search Report and Written Opinion of the International Searching Authority for PCT Patent Application No. PCT/US18/13154 dated Mar. 16, 2018; 8 pages.

(56) References Cited

OTHER PUBLICATIONS

International Search Report and Written Opinion of the International Searching Authority for PCT Patent Application No. PCT/US18/13162 dated Mar. 23, 2018; 7 pages.
International Search Report and Written Opinion of the International Searching Authority for PCT Patent Application No. PCT/US18/13167 dated May 4, 2018; 8 pages.
Office Action for U.S. Appl. No. 15/864,544 dated Apr. 19, 2018; 19 pages.
Office Action for U.S. Appl. No. 15/864,604 dated May 31, 2018; 16 pages.
Office Action for U.S. Appl. No. 15/864,663 dated May 16, 2018; 15 pages.
Office Action for U.S. Appl. No. 15/864,709 dated Apr. 12, 2018; 23 pages.
Japanese Patent Office, Notice of Reasons for Rejection dated Jan. 29, 2020 in Japanese Patent Application No. 2019-538400, 12 pages.
Japanese Patent Office, Notice of Reasons for Rejection dated Feb. 4, 2020 in Japanese Patent Application No. 2019-538321, 16 pages.
The International Searching Authority, Notification of Transmittal of the International Search Report and Written Opinion of the International Searching Authority dated Oct. 23, 2019 in International Application No. PCT/US2019/041114, 11 pages.
China National Intellectual Property Administration, China Office Action in related CN Patent App. No 201880006674.9, dated Mar. 10, 2020, 6 pages.
Japanese Patent Office, Notice of Reasons for Rejection dated Feb. 10, 2020 in Japanese Patent Application No. 2019-544059, 10 pages.
The International Searching Authority, Notification of Transmittal of the International Search Report and Written Opinion of the International Searching Authority dated Feb. 19, 2021 in International Application No. PCT/US2020/059680, 11 pages.
International Searching Authority, Search Report and Written opinion in related PCT/US2019/023828, dated Jun. 14, 2019, 10 pages.
International Search Report and Written Opinion of the International Searching Authority for PCT Patent Application No. PCT/US21/12954 dated Mar. 26, 2021; 11 pages.
The International Searching Authority, International Search Report and Written Opinion for PCT/US2022/024204 dated Jul. 1, 2022, 8 pages.

\* cited by examiner

SYSTEM, METHOD AND APPARATUS FOR DIRECT LIQUID-COOLED AXIAL FLUX ELECTRIC MACHINE WITH PCB STATOR

BACKGROUND OF THE DISCLOSURE

Field of the Disclosure

This disclosure relates in general to an axial field rotary energy device and, in particular, to a system, method and apparatus for a liquid-cooled axial flux electric machine, such as permanent magnet motors and generators having one or more printed circuit board (PCB) stators.

Background

Many high-power density electric machines (2.0 kW/kg and higher) can have a cylindrical rotor that is concentric to a cylindrical stator that carries conductive coils. The rotor can have conductive coils or magnets. The rotor rotates about its axis of rotation that is coincident with the axis of the stator. The air gap between the major surfaces of the rotor and stator can be narrow, such as 1 mm or less). Due to their high-power density, many of these machines are liquid-cooled. The cooling method can be direct or indirect. Indirect liquid cooling can be accomplished by having a cooling jacket carrying a liquid coolant mounted around the machine's stator, or by having cooling ducts embedded in the machine's stator as described in U.S. Pat. No. 8,201,316. Direct cooling can be achieved by spraying a coolant directly over the stator winding of the electric machine. Some of the direct cooling methods can use mineral or synthetic oil. When direct cooling is employed, the coolant is directed to the coil end turns, which is the portion of the coils that protrudes axially at both ends of the stator. It is undesirable to have the liquid coolant in the air gap because it will cause excessive drag losses in the narrow air gap.

Some axial field permanent magnet (PM) rotary devices, such as motors or generators, use printed circuit board (PCB) stator structures. Examples include U.S. Pat. Nos. 10,141,803, 10,135,310, 10,340,760, 10,141,804 and 10,186,922, each of which is incorporated herein by reference in its entirety. These devices can include one, two or more PCB stators, such as one PCB stator for each electrical phase of the device. Some devices may include a PCB stator having windings for more than one phase.

Each PCB stator can include a plurality of coils formed, for example, in a copper laminated structure of the PCB. As the device is powered, electrical currents circulate through the coils. The circulation of currents through the PCB stator coils produces resistive losses, and the interactions between those currents and external magnetic fields, and magnetic fields produced by the currents themselves, produce eddy current losses. The combination of the resistive and eddy currents losses generate heat in the PCB stator. This is an undesired effect of the circulation of currents in the PCB stator, as it increases the temperature of the stator. In extreme cases, the temperature rise of the PCB stator may exceed the temperature class of the laminate used in the PCB stator, leading to its premature failure. Thus, it is desirable to remove heat from the PCB stator to keep its temperature below the temperature class of the PCB laminate material.

The mechanisms for removing heat from the PCB stator can include conduction, convection, and radiation heat transfer. Some of the heat generated in the coil conductors can be carried by conduction to the external surfaces of the PCB stator where it can be removed by a coolant flow. Air is commonly used as a coolant, however due to its low density (approximately 1.2 kg/m$^3$), low thermal capacity (approximately 1.00 kJ/kg·K) and poor thermal conductivity (0.026 W/m·K), air is not the most effective coolant. In some high-power density applications where PCB stator losses can exceed 1,500 kW/m$^3$, for example, air cooling becomes less effective, limiting the power of the axial field PM rotary device. In those high-power density applications, coolants with higher thermal conductivity, thermal capacity and density can remove heat from the stator more effectively, allowing for higher power densities. For example, a liquid coolant (e.g., mineral oil) with a thermal conductivity of 0.15 W/m·K, thermal capacity of 1.67 kJ/kg·K and density of 800 kg/m$^3$ can remove heat from a PCB stator at a faster rate than air, enabling power densities 3 times or higher than what would be possible with air cooling, depending on coolant flow rates.

Some solutions to these problems have been proposed in the past, but they have significant shortcomings. For example, GB2485185 discloses a PCB stator in a hermetically-sealed case that contains the coolant fluid. The hermetic case forms a complicated structure that is difficult to build. When the stator must be replaced, the hermetic case must be dismantled. Moreover, the hermetic case fundamentally interferes with the magnetic flux path between the rotor and stator, which significantly reduces its machine power and efficiency.

For those who are skilled in the art it will become apparent that the following disclosure greatly simplifies and enhances the direct cooling of axial field permanent magnet (PM) rotary devices.

SUMMARY

Embodiments of a system, method and apparatus for an axial field rotary energy device are disclosed. For example, the system can include a housing and rotors having an axis of rotation that are rotatably coupled to the housing. Each rotor includes a magnet. A stator assembly is located axially between the rotors and coupled to the housing. The stator assembly includes a printed circuit board (PCB). The PCB includes a plurality of layers, and each layer comprises a plurality of coils. A shaft is coupled to the rotors and the housing. The shaft can dispense a liquid coolant between the rotors and stator assembly. The housing can include a sump to collect the liquid coolant.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

DETAILED DESCRIPTION

This disclosure includes embodiments of systems comprising an axial field PM rotary device. The device can include at least one stator, such as a PCB stator mounted in a housing along an axis. A rotor assembly can be rotatably mounted within the housing along the axis. The rotor assembly can have rotors on opposite axial ends of the PCB stator and can have features that provide for the distribution of a liquid coolant over the PCB stator surfaces. The housing can have features that can collect the liquid coolant and redirect it to a coolant circulation and cooling system that, in turn, returns the coolant back to the axial field PM rotary device.

Figure 1:
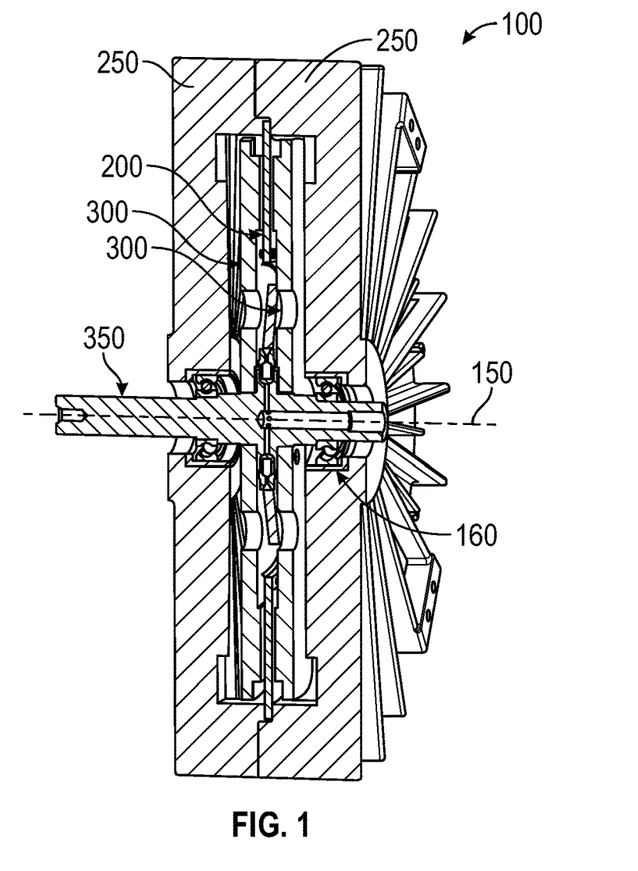
FIG. 1 is an isometric sectional view of an axial field PM rotary device with a PCB stator.

As shown in FIG. 1, an embodiment of an axial field PM rotary device 100, such as a motor or generator, can use a stator such as a PCB stator 200. The PCB stator 200 can be located between rotor discs 300 that are coupled to a shaft 350. The rotor discs 300 and shaft 350 can rotate about an axis of rotation 150 and include bearings 160 coupled to a housing 250. In FIG. 1, the housing 250 can include two housing components that are coupled together. The rotor discs 300 carry magnets that generate a magnetic field that interacts with electrical currents that flow through the PCB stator 200.

Figure 2:
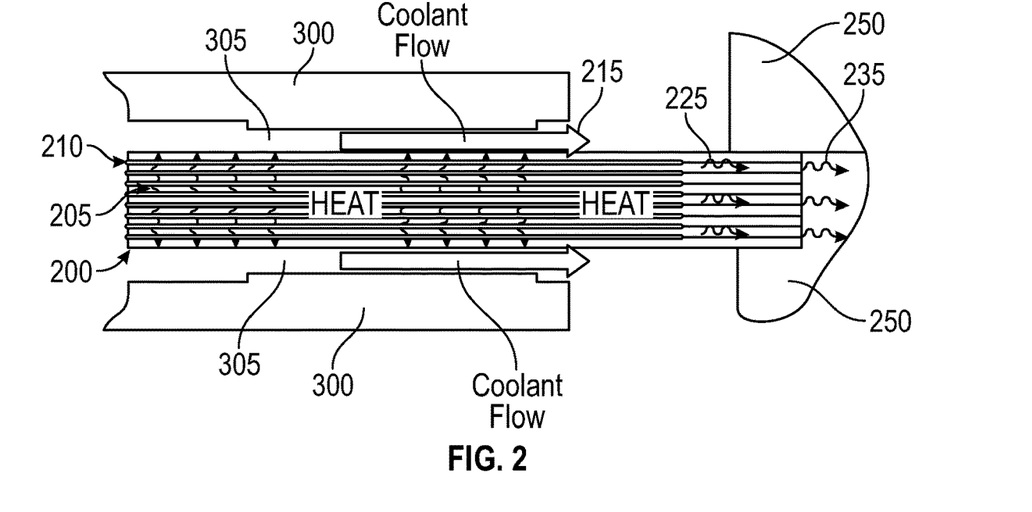
FIG. 2 is a schematic sectional side view of a portion of a PCB stator mounted to a machine housing, showing a heat flow scheme.

The axial field PM rotary device 100 can rely on conduction, convection, and radiation to remove heat from the PCB stator 200. FIG. 2 shows some of the heat removal mechanisms in and around the PCB stator 200, which has coils 210. Some of the heat generated in the conductors of the coils 210 is carried by conduction 205 to the external surfaces of the PCB stator 200. This heat can be removed by a coolant flow 215 that flows in the air gaps 305 between the stator 200 and the rotor discs 300. Other portions of the heat generated by the stator coils 210 can be carried by other conduction 225 along the layers of the PCB stator 200 toward the area where the PCB stator 200 is coupled to the housing 250. Heat 235 can continue to be conducted through the machine housing 250 towards cooler surfaces and volumes, as illustrated in FIG. 2.

Some axial field PM rotary devices with PCB stators may be designed to provide high power. In such cases, the resistive and eddy current losses associated with the currents circulating through the conductors in the PCB stator can be high and exceed the heat removal capability of air cooling. The excess heat in high power PCB stators can cause the stator to overheat and exceed the temperature class rating of its PCB laminate material. For high power applications, this disclosure replaces air as the stator cooling fluid with a liquid coolant. One example of a liquid coolant is mineral oil. Other coolants also can be used. For example, coolants that are not electrically conductive and not corrosive can be used to cool the PCB stator, such as mineral or synthetic transmission oil, transformer oil, silicone-based oil, and others. In some embodiments the coolant can be a mixture of water glycol, such as 60/40 water-MEG or 60/40 water-PEG.

Figure 3:
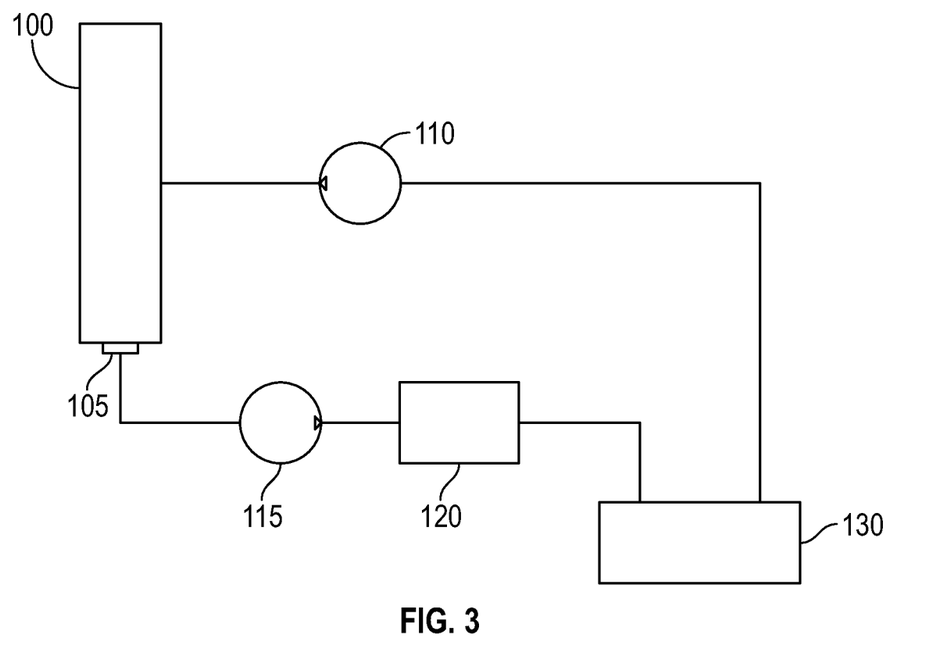
FIG. 3 is a schematic diagram of a system comprising an axial field PM rotary device and a liquid coolant circulation system with a separate heat exchanger for the liquid coolant.

FIG. 3 depicts an embodiment of a system where an axial field PM rotary device 100 is liquid cooled. The system can have a primary pump 110 that can provide a liquid coolant to the axial field PM rotary device 100. The liquid coolant can exit the axial field PM rotary device 100 through a drain 105 and be directed to a scavenge pump 115. From the scavenge pump 115, the liquid coolant can go through a separate heat exchanger 120 where the liquid is cooled to a lower temperature and returned to a reservoir 130. Examples of the separate heat exchanger 120 can include a liquid-to-air or a liquid-to-liquid heat exchanger. The primary pump 110, in turn, can recirculate the liquid coolant back to the axial field PM rotary device 100.

Figure 4:
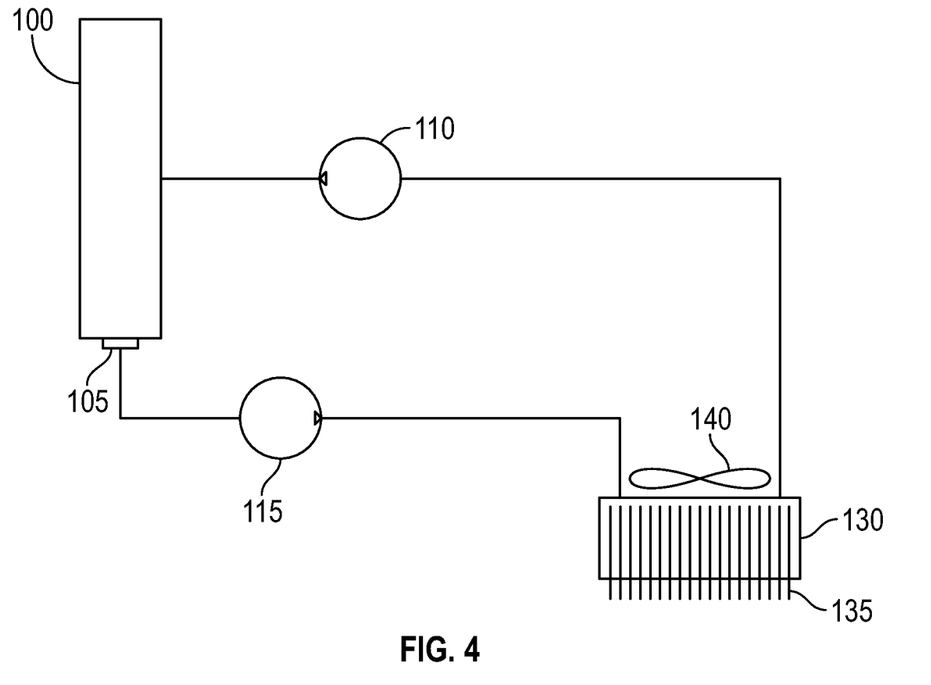
FIG. 4 is a schematic diagram of a system comprising an axial field PM rotary device and a liquid coolant circulation system with a coolant reservoir.

FIG. 4 shows an alternate embodiment of the system depicted in FIG. 3 where a primary pump 110 provides a liquid coolant to the axial field PM rotary device 100. The liquid coolant can exit the axial field PM rotary device through a drain 105 and be directed to a scavenge pump 115, which in turn, returns the liquid coolant directly to the reservoir 130. The reservoir 130 can have features to remove heat from the liquid coolant, such fins 135 and/or a cooling fan 140.

Figure 5:
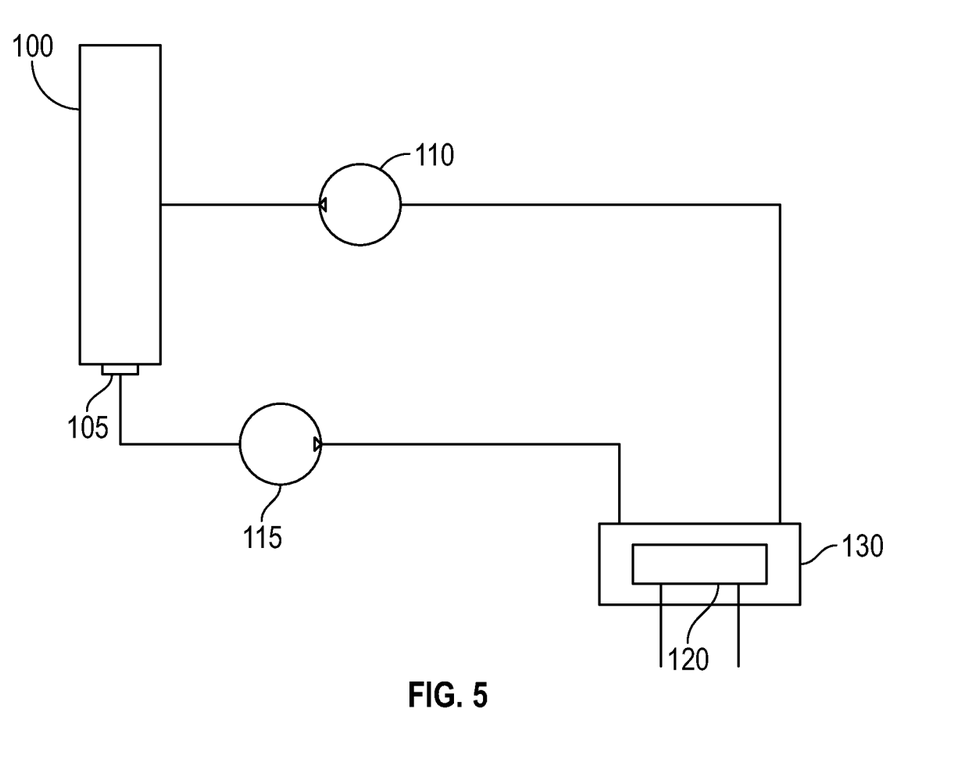
FIG. 5 is a schematic diagram of a system comprising an axial field PM rotary device and a liquid coolant circulation system with a reservoir coupled to a heat exchanger.

FIG. 5 shows yet another embodiment of the system depicted in FIG. 3. The primary pump 110 provides a liquid coolant to the axial field PM rotary device 100. The liquid coolant can exit the axial field PM rotary device 100 through a drain 105 and be directed to a scavenge pump 115, which in turn, returns the liquid coolant directly to the reservoir 130. The reservoir 130 can be coupled to a heat exchanger 120 that can remove heat from the liquid coolant. As an example, the heat exchanger 120 can be a liquid-to-liquid heat exchanger.

Other embodiments of the systems depicted in FIGS. 3 to 5 also can have sensors. The sensors can include flow meters, thermocouples, pressure gauges, and other sensors to monitor the liquid coolant flow, pressure, and temperature. Furthermore, still other embodiments can include valves to control the liquid coolant flow and pressure.

Figure 6:
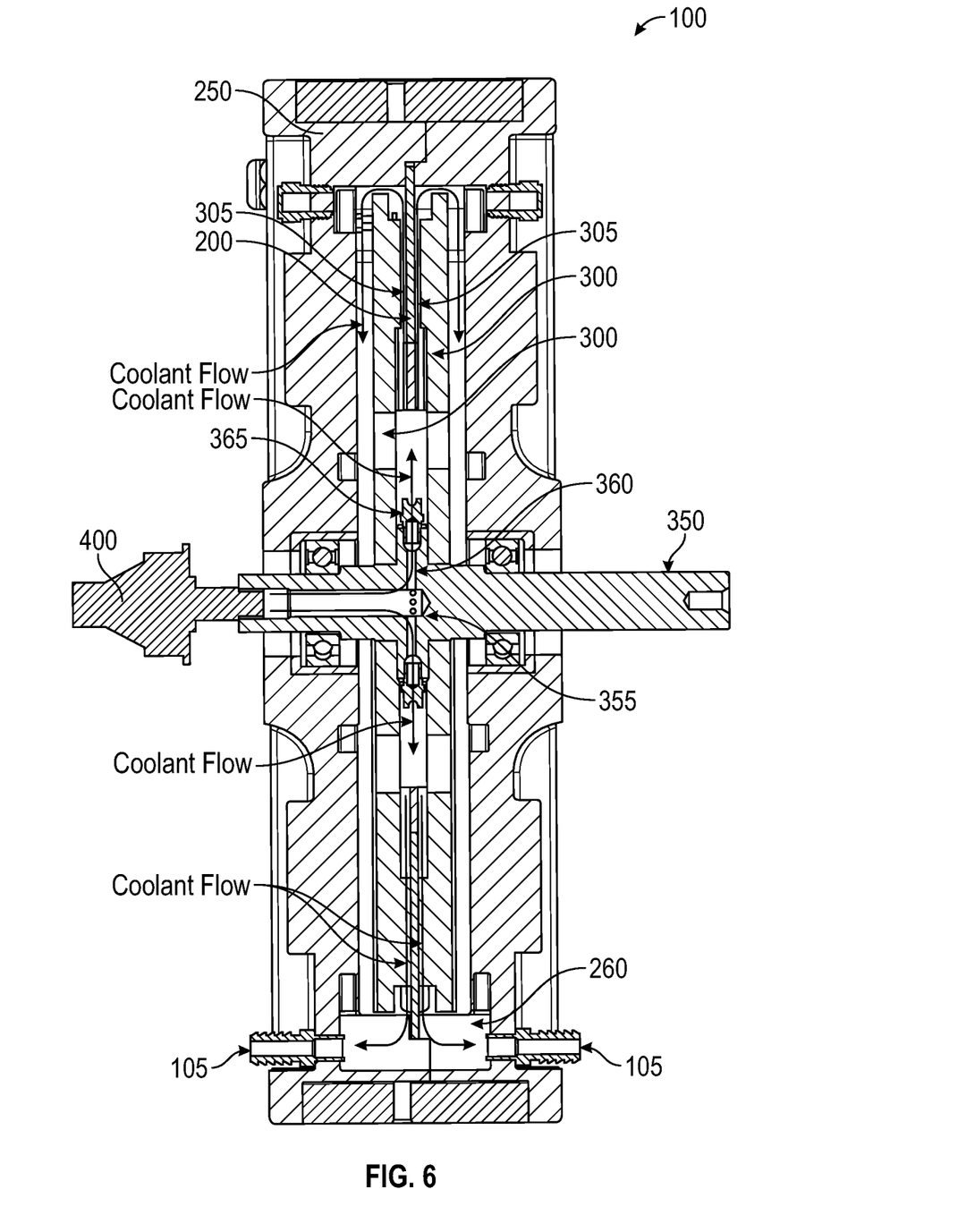
FIG. 6 is a sectional view of an axial field PM rotary device with PCB stator showing an embodiment of a liquid coolant circulation system.

FIG. 6 depicts an example of an axial field PM rotary device 100 with features that enable the liquid coolant circulation through the device. In the embodiment depicted in FIG. 6, the axial field PM rotary device 100 has a shaft 350 with a hollow section 355 that can be connected at the end of the shaft 350 to a rotary connector 400. Liquid coolant can be delivered to the axial field PM rotary device 100 via the rotary connector 400 and hollow section 355. The hollow section 355 can be coupled to one or more radial channels 360 that can direct and spread the liquid coolant radially between the static PCB stator 200 and the rotating rotor discs 300. Some embodiments can have nozzles 365 coupled to the radial channels 360 that can spread and/or direct the coolant and/or control the coolant flow. In an example, once the coolant enters the space between the rotor discs 300, it can flow radially through the air gaps 305 (i.e., one air gap 305 on each major side of the PCB stator 200) between the rotor discs 300 and the PCB stator 200 to remove heat from the PCB stator 200, as generally depicted in FIG. 2. The air gap 305 can have a width of 1.0 mm or more, for example, which allows for the liquid coolant to flow radially without creating excessive drag losses. The air gap 305 can be up to about 2.5 mm, in some examples. Other examples can include an air gap range of 1.1 mm (or 1.2 mm) to 2.5 mm, or 1.5 mm to 2.0 mm in still other examples. Alternative embodiments can include an air gap of up to 3.0 mm. Each of these versions can have negligible or insignificant drag losses from the liquid coolant. In prior art devices with narrower air gaps, however, excessive drag losses can be 2 or more times the mechanical losses of the device.

Referring again to FIG. 6, the liquid coolant exits the air gaps 305 at the periphery of the rotor discs 300 then flow in the space between the rotor discs 300 and the interior walls of the housing 250, and collect at a sump 260. In some examples, the liquid coolant can exit the housing 250 through one or more drains 105. Although FIG. 6 shows two drains 105 on opposing sides of the housing, other embodiments can have only one drain or more than two drains. Furthermore, the drains 105 can be located at the bottom side of the housing 250.

Figure 7:
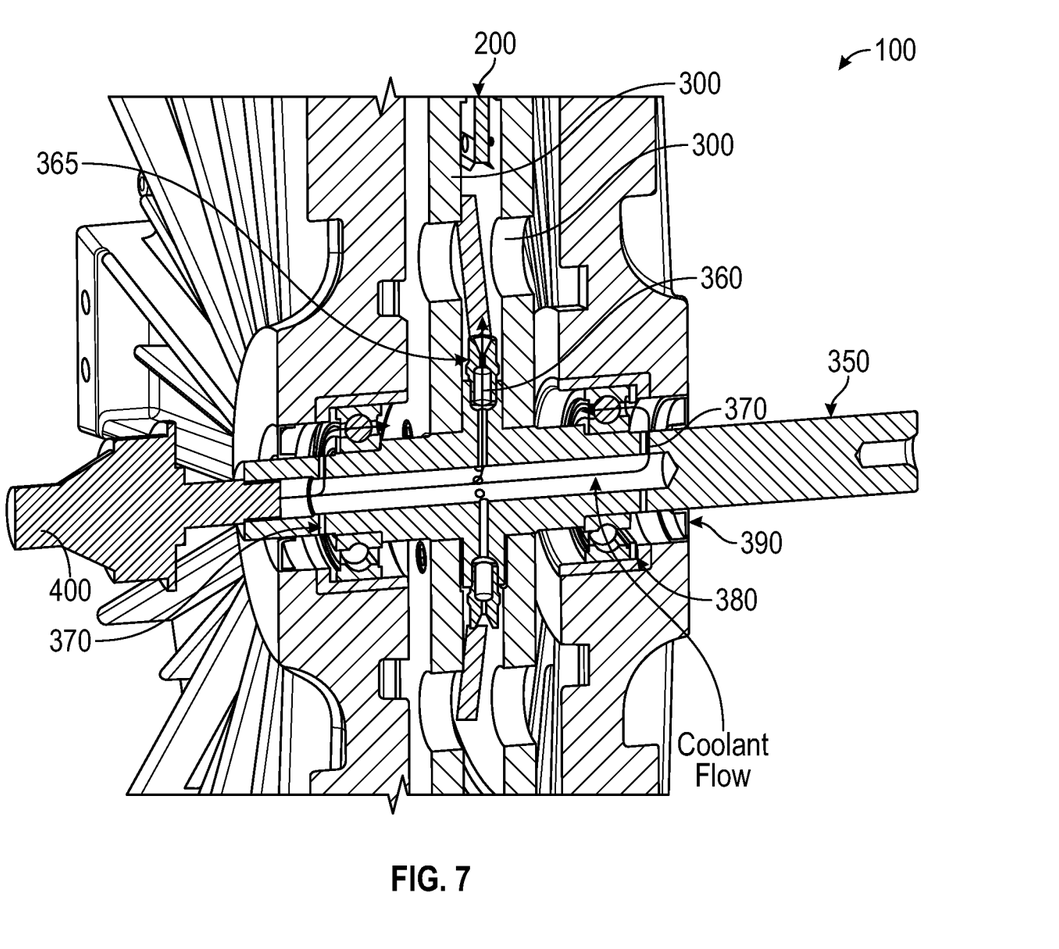
FIG. 7 is an isometric sectional view of an axial field PM rotary device with PCB stator showing an embodiment of a bearing lubrication and cooling system.

In the embodiment of FIG. 7, the liquid coolant can be an oil which can have the dual function of cooling the PCB stator 200, and lubricating and cooling the bearings 380 of the axial field PM rotary device 100. In some examples, the shaft 350 can include a hollow section 355 that extends from one end of the shaft 350 to the area under both bearings 380 and the rotor discs 300. As described for the example of FIG. 6, the oil can enter the hollow section 355 through the rotary connector 400. In addition to the radial channels 360 that distribute and dispense the cooling oil to the space between the rotor discs 300, this embodiment can have radial channels 370 that distribute and dispense oil to lubricate the bearings 380. The oil can flow through the bearings 380 and into the housing where it can mix with the oil flow cooling the stator PCB 200. The embodiment shown in FIG. 7 can have mechanical seals 390 that can retain and prevent the oil from leaking along the shaft 350.

Figure 8:
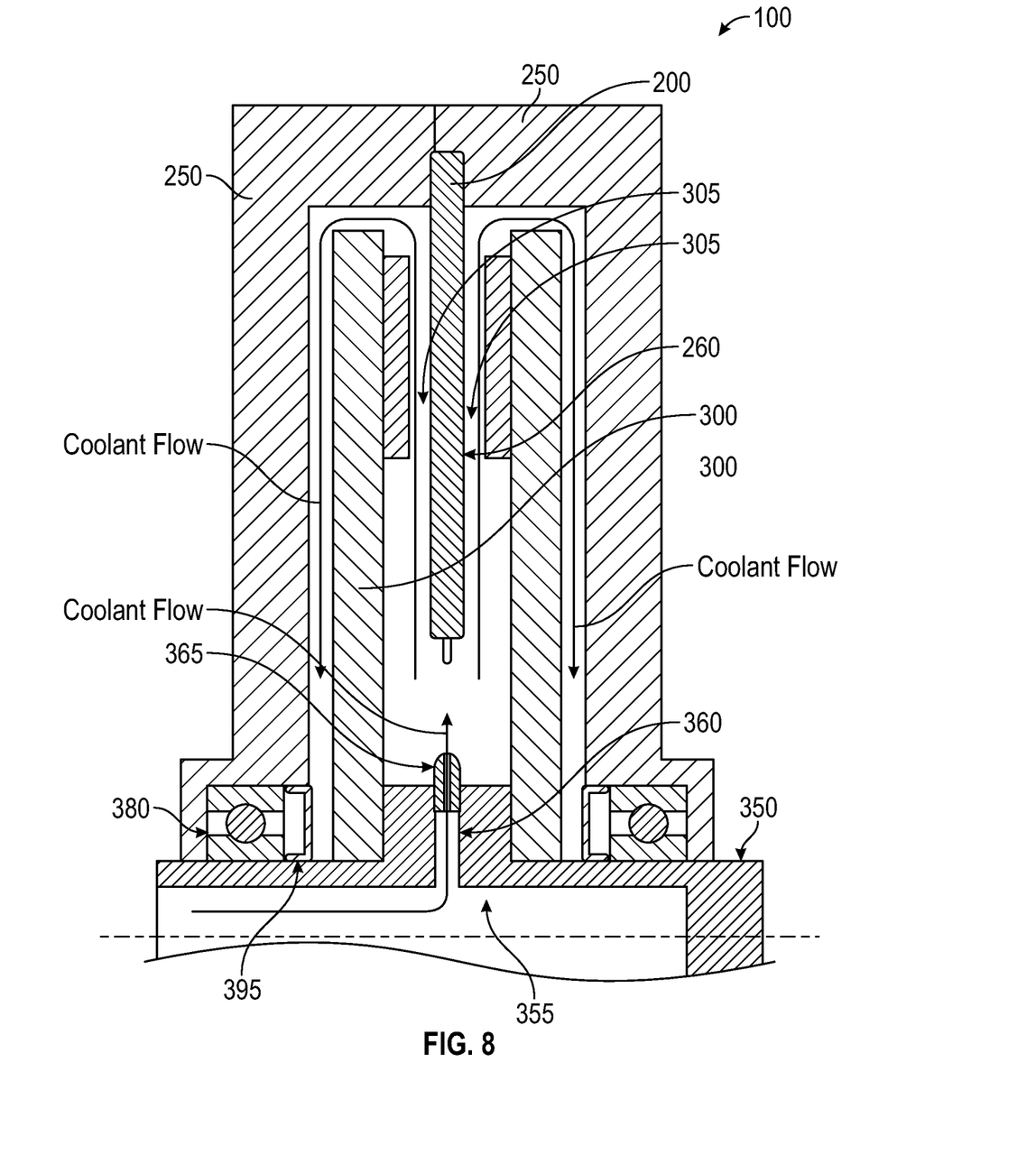
FIG. 8 is sectional view of an axial field PM rotary device showing an embodiment of a liquid coolant system where the stator is clad in a protective envelope.

Some embodiments of the axial field PM rotary device 100 can use a water-based coolant or some other coolant that can be corrosive. FIG. 8 shows an example of such an embodiment. In this version, liquid coolant enters the device through the hollow section 355 of the shaft 350 and flows radially through the radial channels 360 and nozzles 365 into the space between the rotor discs 300. The liquid coolant continues to flow radially through the air gaps 305 between the rotor discs 300 and PCB stator 200. In some examples, the PCB stator 200 can have a cladding 260 that prevents the liquid coolant from directly contacting the PCB stator 200. Embodiments of the cladding 260 can completely envelop and seal the PCB stator 200 from exposure to the liquid coolant. The cladding 260 can be formed from, for example, a thin sheet of a non-magnetic, corrosion-resistant material, such as Inconel 625, poly ether ketone (PEEK), acrylic-based conformal coating, Parylene conformal coating, or still other materials.

The liquid coolant exits the air gaps 305 at the outer periphery of the rotor discs 300 then flows in the space between the rotor discs 300 and the interior walls of the housing 250. The liquid coolant can be collected and/or recycled as described elsewhere in this disclosure. Embodiments can have internal seals 395 to prevent the liquid coolant from contacting the bearings 380.

Device Examples

1. An axial field rotary energy device, comprising:
a housing;
rotors having an axis of rotation and rotatably coupled to the housing, and each rotor comprises a magnet;
a stator assembly located axially between the rotors and coupled to the housing, the stator assembly comprises a printed circuit board (PCB), the PCB comprises a plurality of layers, and each layer comprises a plurality of coils;
a shaft coupled to the rotors and the housing, the shaft having a hollow section configured to be coupled to a source of a liquid coolant and to a radial channel in the shaft that is configured to dispense the liquid coolant between the rotors and stator assembly; and
the housing comprises a sump that is configured to collect the liquid coolant.

2. The device wherein the shaft is configured to be coupled to the source of liquid coolant through a rotary connector.

3. The device wherein the radial channel is coupled to a nozzle.

4. The device wherein the liquid coolant is configured to flow between the stator assembly and rotors, and between the rotors and inner walls of the housing to the sump at a bottom of the housing.

5. The device wherein an air gap between the stator assembly and each of the rotors is at least 1.2 mm and not greater than 2.5 mm.

6. The device further comprising a pump system that is external to the housing, the pump system comprising:
a reservoir for liquid coolant;
a primary pump configured to deliver the liquid coolant to the axial field rotary energy device; and
a scavenge pump configured to collect the liquid coolant and pump the liquid coolant back to the reservoir.

7. The device wherein the reservoir comprises a cooling fan and fins to cool the liquid coolant.

8. The device wherein scavenge pump is configured to pump the liquid coolant through a separate heat exchanger before the liquid coolant is returned to the reservoir.

9. The device wherein the reservoir comprises an integrated liquid-to-liquid heat exchanger.

10. The device wherein the liquid coolant comprises an oil with cooling and lubricating properties.

11. The device wherein the radial channel is configured to distribute and dispense the oil to bearings of the device.

12. The device wherein the oil is configured to flow between the stator assembly and rotors, and between the rotors and walls of the housing to the sump at a bottom of the housing.

13. The device further comprising a pump system having:
a reservoir for the oil;
a primary pump configured to deliver oil to the device; and
a scavenge pump configured to collect oil and pump the oil back to the reservoir.

14. The device wherein the reservoir comprises a cooling fan and fins to cool the oil.

15. The device wherein the reservoir comprises an integrated liquid-to-liquid heat exchanger.

16. The device wherein scavenge pump is configured to pump the oil through a separate heat exchanger before the oil is returned to the reservoir.

17. The device wherein the stator assembly is clad with a non-magnetic, corrosion-resistant material.

System Examples

1. An axial field rotary energy system, comprising:
a housing;
rotors having an axis of rotation and rotatably coupled to the housing, and each rotor comprises a magnet;

a stator assembly located axially between the rotors and coupled to the housing, the stator assembly comprises a printed circuit board (PCB), the PCB comprises a plurality of layers, and each layer comprises a plurality of coils;

a shaft coupled to the rotors and the housing, and the shaft can dispense a liquid coolant between the rotors and stator assembly; and the housing comprises a sump to collect the liquid coolant.

2. The system wherein the shaft is coupled to a source of liquid coolant through a rotary connector.

3. The system wherein the radial channel is coupled to a nozzle.

4. The system wherein the liquid coolant can flow between the stator assembly and rotors, and between the rotors and inner walls of the housing to the sump at a bottom of the housing.

5. The system wherein an air gap between the stator assembly and each of the rotors is at least 1.2 mm and not greater than 2.5 mm.

6. The system further comprising a pump system having:
a reservoir of the liquid coolant;
a primary pump delivers the liquid coolant to the axial field rotary energy system; and
a scavenge pump collects the liquid coolant and pumps the liquid coolant back to the reservoir.

7. The system wherein the reservoir comprises a cooling fan and fins to cool the liquid coolant.

8. The system wherein scavenge pump pumps the liquid coolant through a separate heat exchanger before the liquid coolant returns to the reservoir.

9. The system wherein the reservoir comprises an integrated liquid-to-liquid heat exchanger.

10. The system wherein the liquid coolant comprises a fluid with cooling and lubricating properties.

11. The system wherein the radial channel distributes and dispenses the lubricating fluid to bearings of the system.

12. The system wherein the lubricating fluid flows between the stator assembly and rotors, and between the rotors and walls of the housing to the sump at a bottom of the housing.

13. The system further comprising a pump system having:
a reservoir of the lubricating fluid;
a primary pump delivers the lubricating fluid to the axial field rotary energy system; and
a scavenge pump collects and pumps the lubricating fluid back to the reservoir.

14. The system wherein the reservoir comprises a cooling fan and fins to cool the lubricating fluid.

15. The system wherein the reservoir comprises an integrated liquid-to-liquid heat exchanger.

16. The system wherein scavenge pump pumps the lubricating fluid through a separate heat exchanger before the oil returns to the reservoir.

17. The system wherein the stator assembly is clad with a non-magnetic, corrosion-resistant material.

Method Examples

1. A method of operating an axial field rotary energy system, comprising:
rotating rotors inside a housing, and each rotor having a magnet, adjacent to a stator assembly comprising a printed circuit board (PCB), the PCB comprises a plurality of layers, and each layer comprises a plurality of coils;
dispensing a liquid coolant from a shaft coupled to the rotors and housing such that the liquid coolant flows between the rotors and the stator assembly; and
collecting and recirculating the liquid coolant.

2. The method further comprising coupling the shaft to a source of liquid coolant with a rotary connector.

3. The method further comprising coupling a radial channel in the shaft to a nozzle.

4. The method wherein the liquid coolant flows between the stator assembly and the rotors, and between the rotors and inner walls of the housing to a sump at a bottom of the housing.

5. The method further comprising providing an air gap between the stator assembly and each of the rotors that is at least 1.2 mm and not greater than 2.5 mm.

6. The method further comprising a pump system and:
collecting the liquid coolant in a reservoir;
delivering the liquid coolant to the axial field rotary energy system; and
delivering the liquid coolant back to the reservoir.

7. The method further comprising cooling and radiating thermal energy from the liquid coolant.

8. The method further comprising pumping the liquid coolant through a separate heat exchanger before returning the liquid coolant to the reservoir.

9. The method further comprising circulating the liquid coolant through an integrated liquid-to-liquid heat exchanger.

10. The method wherein the liquid coolant comprises a lubricating fluid that cools and lubricates the system.

11. The method further comprising distributing and dispensing the lubricating fluid to bearings of the system.

12. The method wherein the oil flows between the stator assembly and the rotors, and between the rotors and walls of the housing to a sump at a bottom of the housing.

13. The method further comprising a pump system and:
collecting the lubricating fluid in a reservoir;
delivering the lubricating fluid to the axial field rotary energy system; and
delivering the lubricating fluid back to the reservoir.

14. The method further comprising cooling and radiating thermal energy from the lubricating fluid.

15. The method further comprising circulating the lubricating fluid through an integrated liquid-to-liquid heat exchanger.

16. The method further comprising circulating the lubricating fluid through a separate heat exchanger before returning the oil to the reservoir.

17. The method further comprising cladding the stator assembly with a non-magnetic, corrosion-resistant material.

The terminology used herein is for the purpose of describing particular examples and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described herein can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drive (SSD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

We claim:

1. An axial field rotary energy system, comprising:
   a housing having a sump that is configured to collect a liquid coolant, and the liquid coolant comprises an oil with cooling and lubricating properties;
   rotors having an axis of rotation and rotatably coupled to the housing, and each rotor comprises a magnet;
   a stator assembly located axially between the rotors and coupled to the housing, the stator assembly comprises a printed circuit board (PCB), the PCB comprises several integrated layers, and each layer comprises a plurality of coils;
   a shaft coupled to the rotors and sealed to the housing to form a closed system, the shaft comprises a hollow section coupled to a source of the liquid coolant and to a first set of radial channels that is configured to dispense the liquid coolant from the shaft in a radial direction only between the rotors and toward the stator assembly to cool the stator assembly, the hollow section is further coupled to a second set of radial channels to dispense the liquid coolant from the shaft in a radial direction to lubricate bearings of the system, and the second set of radial channels are only axially outboard of the respective bearings on both ends of the shaft, such that the liquid coolant from the second set of radial channels flows axially inward through the bearings toward the rotors to mix with the liquid coolant from the first set of radial channels that cools the stator assembly; and
   the shaft consists of only the first and second set of radial channels.

2. The axial field rotary energy system of claim 1, wherein the shaft is coupled to the source of the liquid coolant through a rotary connector, and the radial channels are coupled to respective nozzles.

3. The axial field rotary energy system of claim 1, wherein the liquid coolant is configured to flow between the stator assembly and rotors, and between the rotors and inner walls of the housing to the sump at a bottom of the housing.

4. The axial field rotary energy system of claim 3, wherein an axial gap between the stator assembly and each of the rotors is up to about 3.0 mm.

5. The axial field rotary energy system of claim 4, wherein the source further comprises a pump system having:
   a reservoir of the liquid coolant;
   a primary pump delivers the liquid coolant to the axial field rotary energy system; and
   a scavenge pump collects the liquid coolant and pumps the liquid coolant back to the reservoir.

6. The axial field rotary energy system of claim 5, wherein the reservoir comprises a cooling fan and fins to cool the liquid coolant.

7. The axial field rotary energy system of claim 5, wherein the scavenge pump pumps the liquid coolant through a separate heat exchanger before the liquid coolant returns to the reservoir.

8. The axial field rotary energy system of claim 5, wherein the reservoir comprises an integrated liquid-to-liquid heat exchanger.

9. The axial field rotary energy system of claim 1, wherein the source further comprises a pump system having:
   a reservoir of the liquid coolant;
   a primary pump delivers the liquid coolant to the axial field rotary energy system; and
   a scavenge pump collects and pumps the liquid coolant back to the reservoir.

10. The axial field rotary energy system of claim 9, wherein the reservoir comprises:
    a cooling fan and fins to cool the liquid coolant; and
    an integrated liquid-to-liquid heat exchanger.

11. The axial field rotary energy system of claim 9, wherein the scavenge pump pumps the liquid coolant through a separate heat exchanger before the oil returns to the reservoir.

12. The axial field rotary energy system of claim 1, wherein the stator assembly is clad with a non-magnetic, corrosion-resistant material.

* * * * *